(No Model.) 6 Sheets—Sheet 1.

J. W. CARVER.
HEEL BURNISHING MACHINE.

No. 401,131. Patented Apr. 9, 1889.

WITNESSES.
J. W. Dolan.
Fred. B. Dolan.

INVENTOR.
James W. Carver
by his attys
Clarke & Raymond (No Model.) 6 Sheets—Sheet 2.
J. W. CARVER.
HEEL BURNISHING MACHINE.
No. 401,131. Patented Apr. 9, 1889.
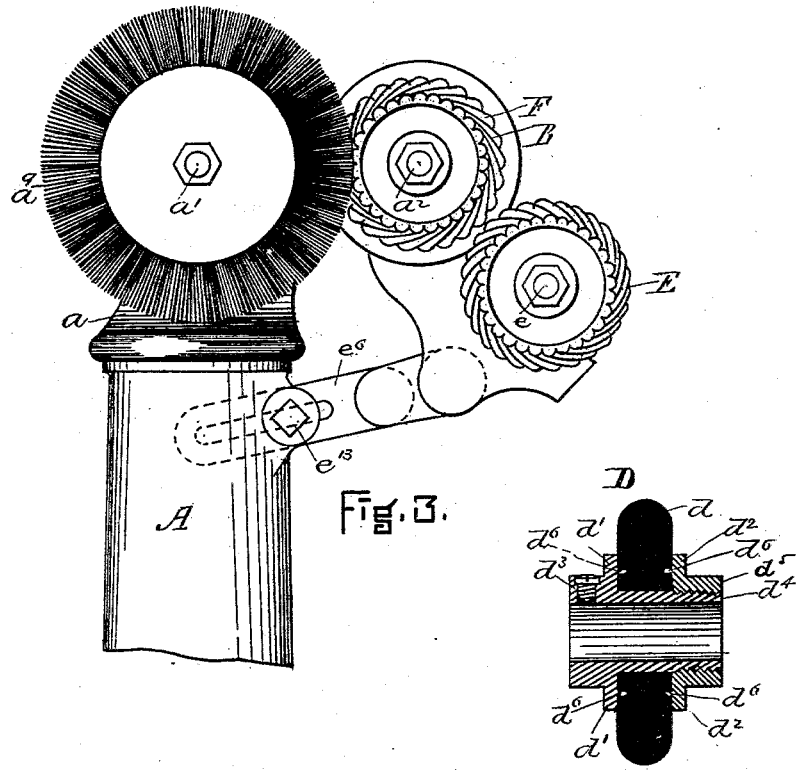
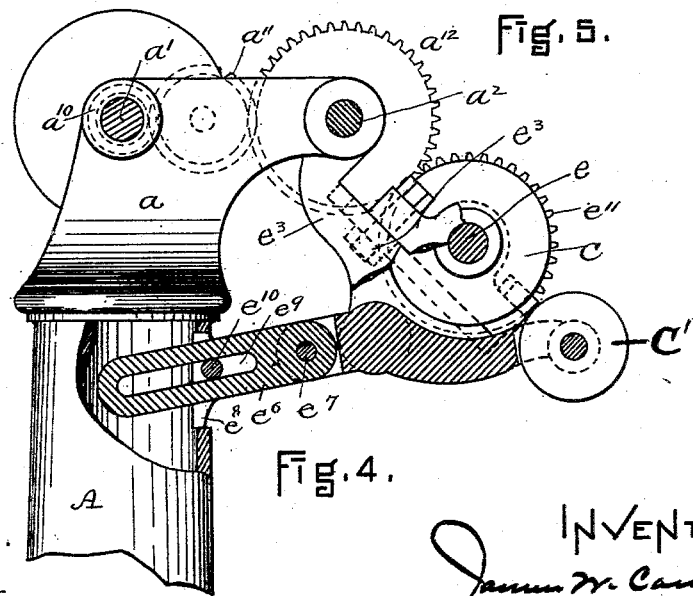
WITNESSES.
INVENTOR.

(No Model.) 6 Sheets—Sheet 3.
J. W. CARVER.
HEEL BURNISHING MACHINE.
No. 401,131. Patented Apr. 9, 1889.
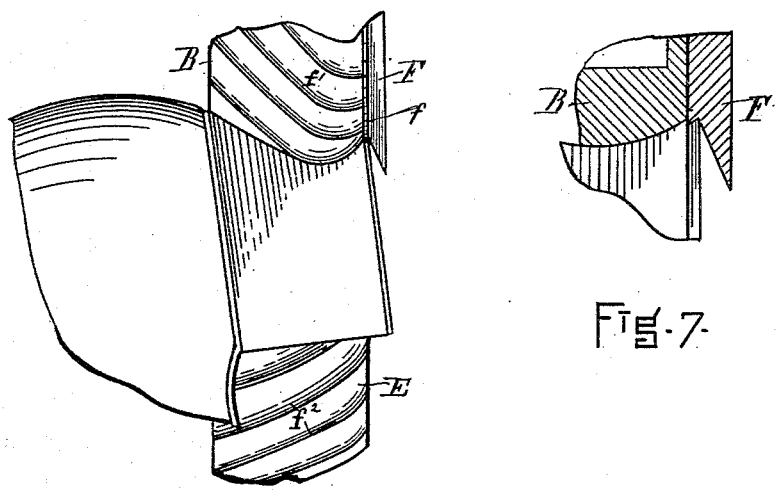
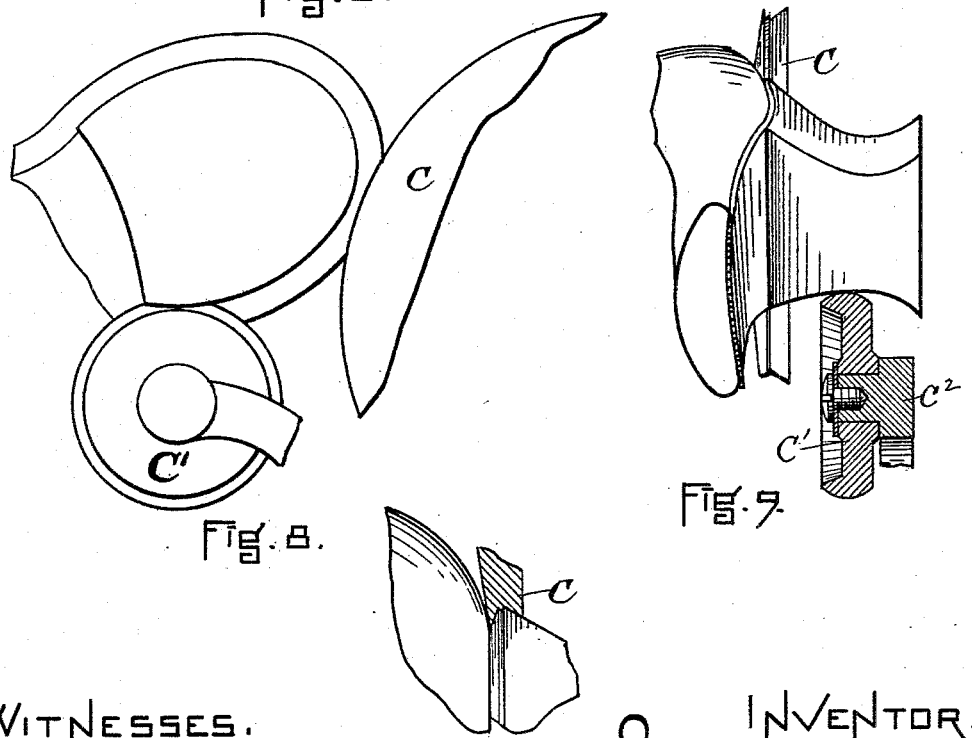
WITNESSES. INVENTOR.

(No Model.) 6 Sheets—Sheet 4.
J. W. CARVER.
HEEL BURNISHING MACHINE.

No. 401,131. Patented Apr. 9, 1889.

WITNESSES.
J. M. Dolan.
Fred. B. Dolan.

INVENTOR.
James W. Carver
by his attys
Clark & Raymond.

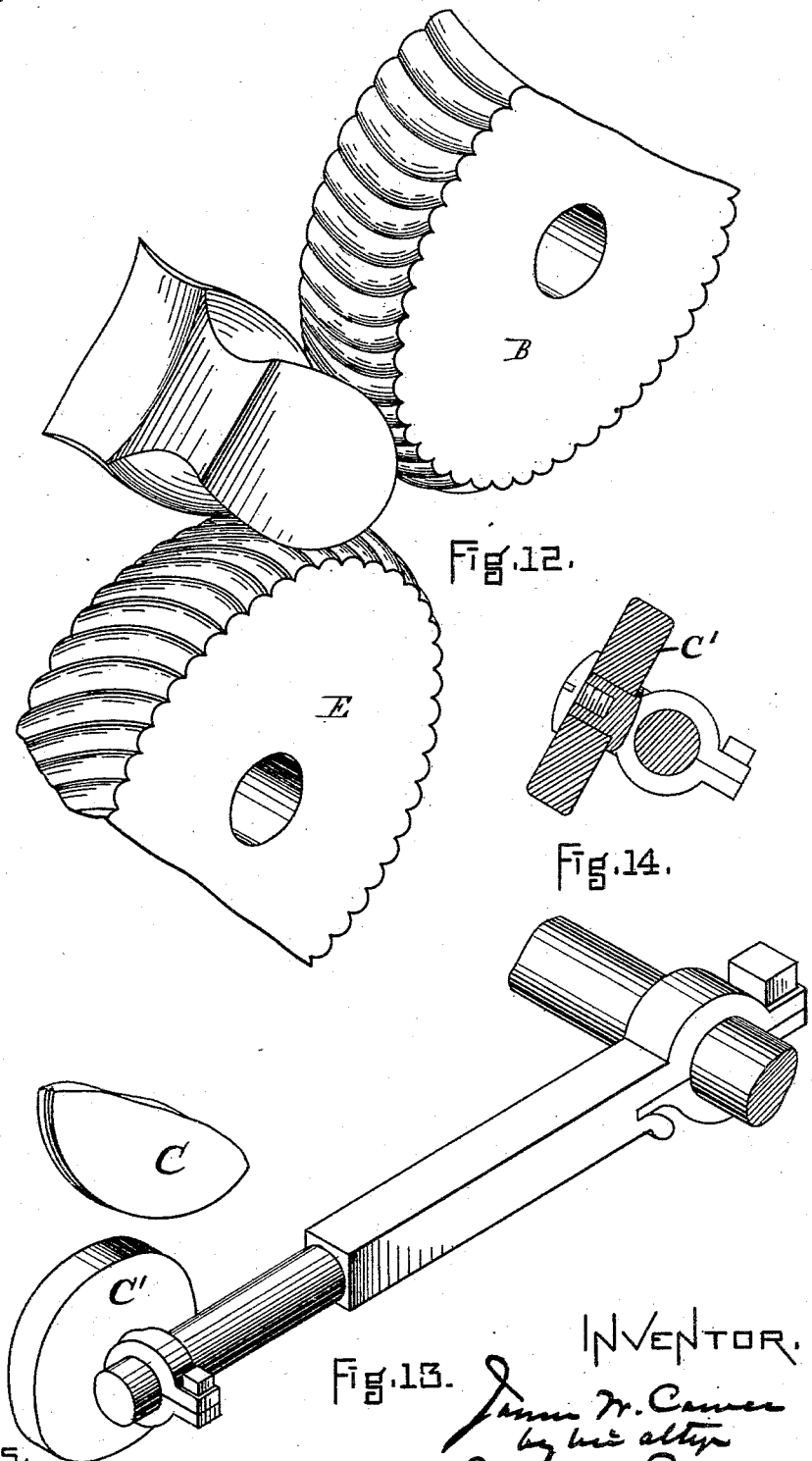

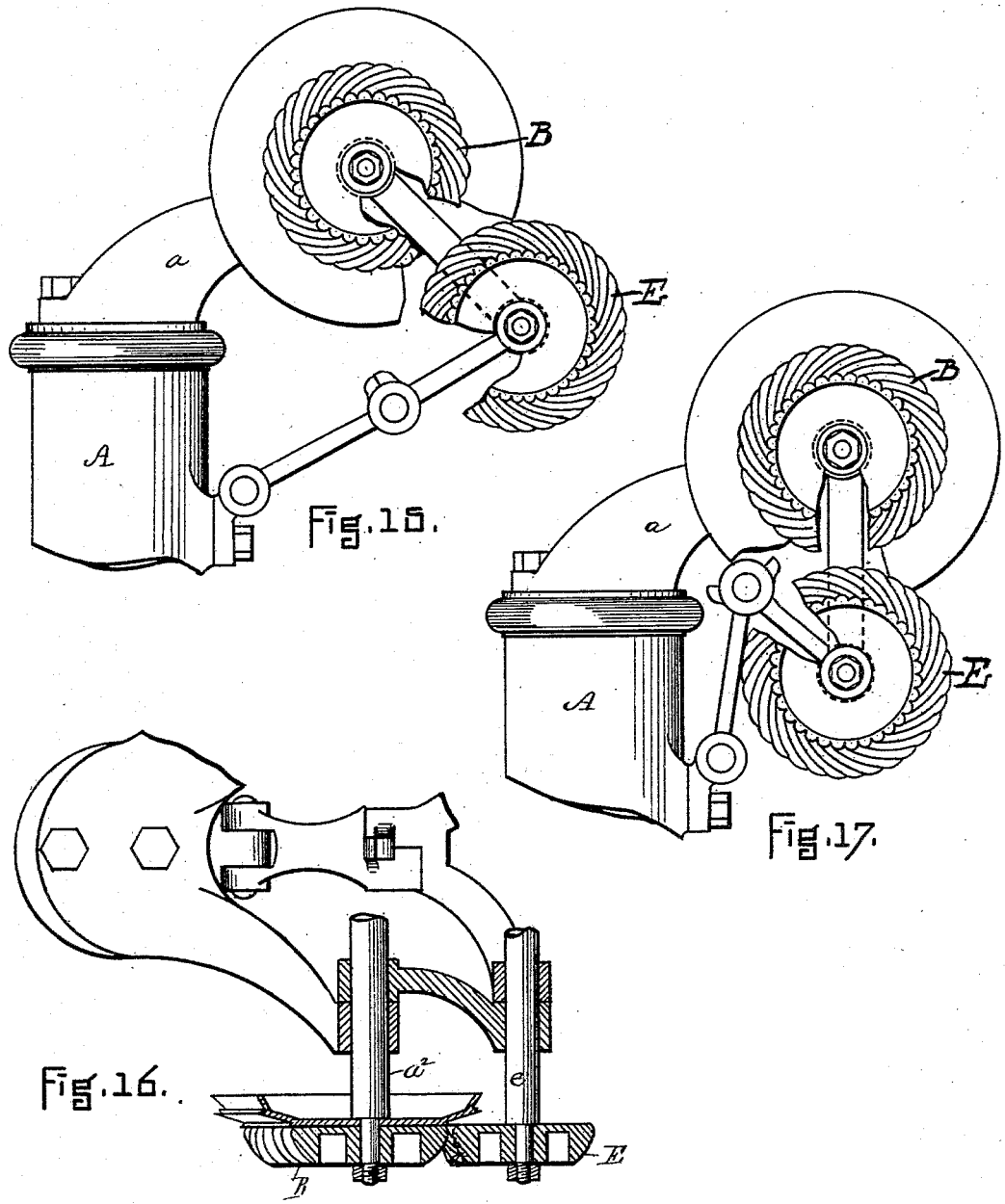

UNITED STATES PATENT OFFICE.

JAMES W. CARVER, OF LYNN, MASSACHUSETTS, ASSIGNOR TO THE NATIONAL HEELING MACHINE COMPANY, OF PORTLAND, MAINE.

HEEL-BURNISHING MACHINE.

SPECIFICATION forming part of Letters Patent No. 401,131, dated April 9, 1889.

Application filed December 10, 1886. Serial No. 221,181. (No model.)

*To all whom it may concern:*

Be it known that I, JAMES W. CARVER, of Lynn, in the county of Essex and State of Massachusetts, a citizen of the United States, have invented a new and useful Improvement in Heel-Burnishing Machines, of which the following is a full, clear, and exact description, reference being had to the accompanying drawings, forming a part of this specification, in explaining its nature.

The object of my invention is to provide an improved heel-burnishing machine in which a rotary burnishing rest-roll co-operates with the main burnishing-roll; and the invention consists in the construction, arrangement, and combinations of parts, as indicated by the claims at the end of this specification.

Figure 1:
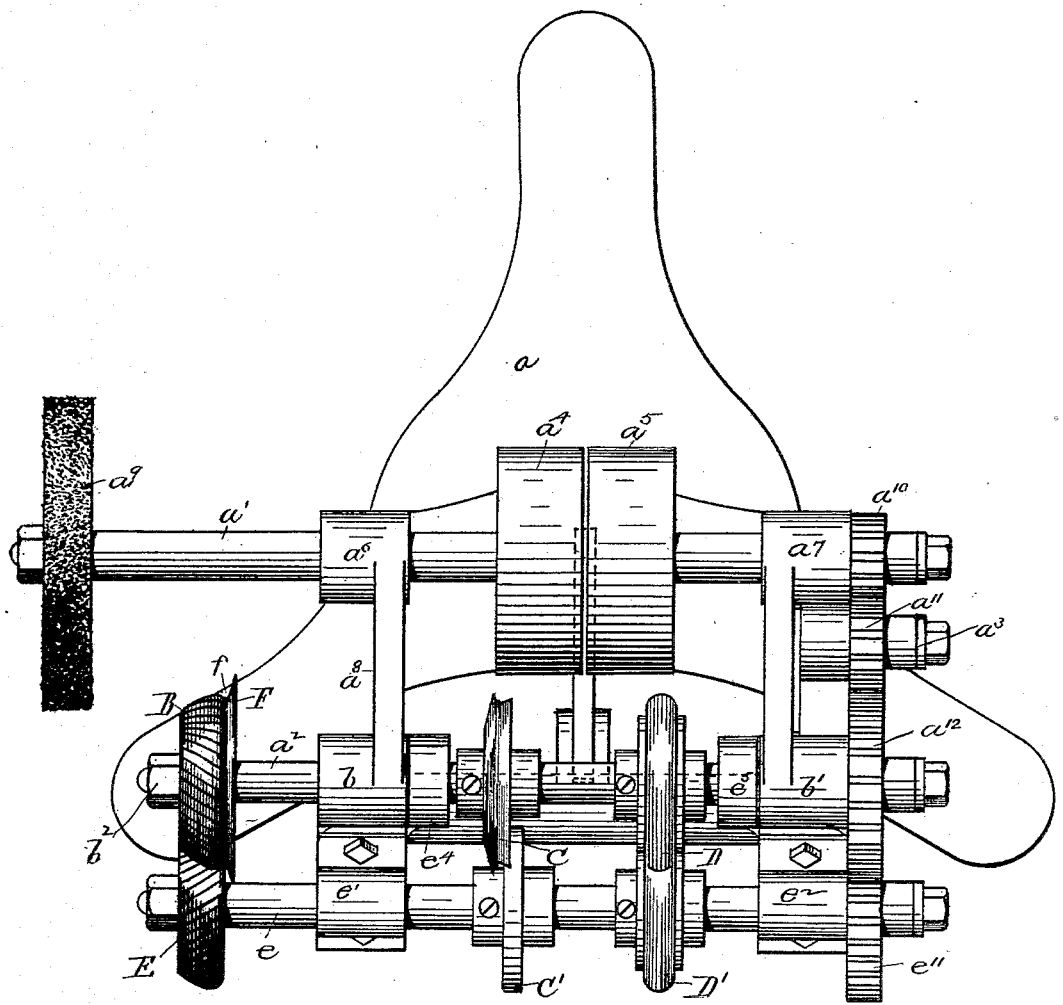
Figure 2:
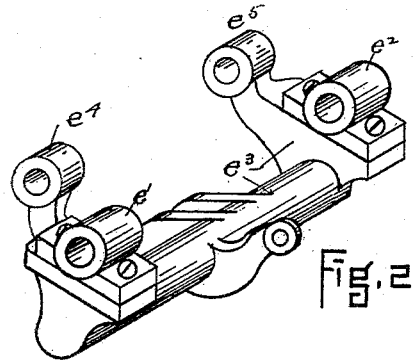
Figure 11:
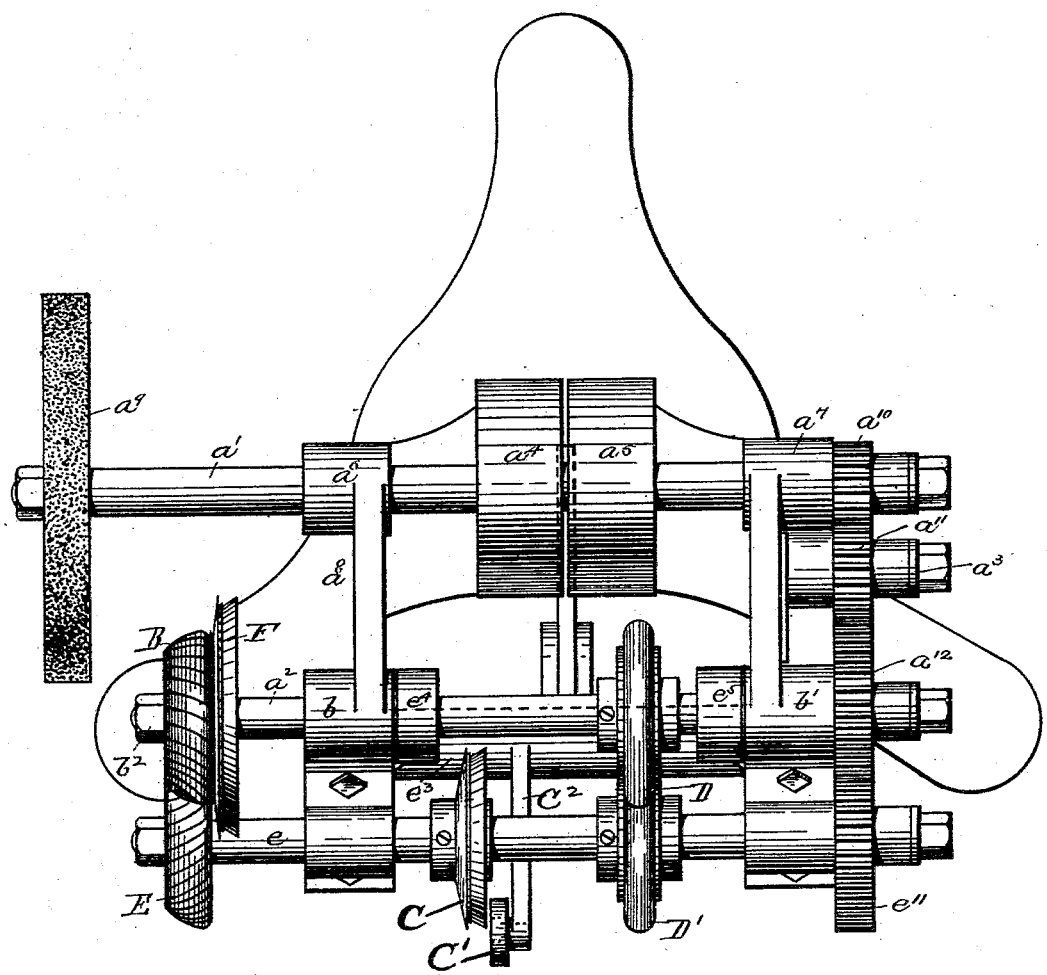
Figure 11A:
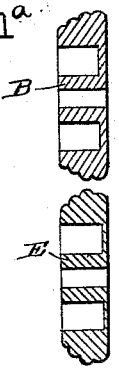

Referring to the drawings, Figure 1 is a plan view of a machine containing the features of my invention. Fig. 2 is a view in perspective of a hanging bracket, to which reference will hereinafter be made. Fig. 3 is a view of the machine in side elevation. Fig. 4 is a view, part in side elevation and part in section, illustrating an organization hereinafter described. Fig. 5 is a vertical section of the wax-roll and of its holding devices. Fig. 6 is a view representing the relation of the heel of a boot or shoe to the rest and to the burnishing-tool. Fig. 7 is a detail view illustrating the top-lift rest and beader and the relation which they bear to the burnishing-roll. Fig. 8 shows a portion of the rand or sole-edge beader, the rest therefor, and representing the relation which the heel bears thereto. Fig. 9 shows the same parts in section and in elevation. Fig. 10 is a vertical section to show the form of the beader. Fig. 11 is a plan view of the machine, illustrating a slight modification hereinafter referred to. Fig. 11$^a$ is a sectional view to illustrate the differently transversely curved surfaces or contours of the burnishing-rolls. Fig. 12 is a view representing in perspective the relation of the burnishing-roll to the burnishing-rest, and showing the position of the heel and the relation thereto during the burnishing process or operation. Figs. 13 and 14 relate to a modification hereinafter mentioned. Figs. 15, 16, and 17 relate to the form of construction in which the rest-roll is movable into and out of operative position with the burnishing-roll.

A represents the post or standard of the machine. It supports the head $a$, which has suitable bearings for the main shaft $a'$, and also for the burnisher-shaft $a^2$, and upon its back edge for the shaft $a^3$, which carries an intermediate gear, hereinafter referred to. The shaft $a'$ carries the fast pulley $a^4$ and the loose pulley $a^5$, which are arranged midway between the two bearings $a^6$ $a^7$. (See Fig. 1.) The shaft is also extended outward from the front side, $a^8$, of the head, and supports or carries at this front end the brushing roll or wheel $a^9$, which is bolted to the end of the shaft. This brings the brushing roll or wheel in the most advanced position. The shaft $a'$ also carries at its rear end the gear-wheel $a^{10}$, which meshes with the intermediate gear, $a^{11}$, on the shaft $a^3$, and this gear in turn meshes with the gear $a^{12}$ on the burnisher-shaft $a^2$. The burnisher-shaft has the bearings $b$ $b'$ in the head $a$, and it is extended forward from the front $a^8$ of the head, but not to such an extent as the shaft $a'$. It carries or supports at its front end the burnishing-wheel B, which is fastened thereto by the nut $b^2$. The form and shape of this roll will be hereinafter described. The shaft $a^2$ also carries the rand or sole-edge beading roll C and the waxing-roll D. Beyond and below the shaft $a^2$ is a third shaft, $e$. This shaft has bearings at $e'$ $e^2$ in the hanger $e^3$, which is carried or suspended from the shaft $a^2$ at the points $e^4$ $e^5$, and which is also attached to the head A, so as to be made movable upon the arc of a circle in relation to the shaft $a^2$ and the parts which it carries by means of the link $e^6$, which is pivoted to the hanger at $e^7$, and which enters the cavity of the post A through the hole $e^8$, has the long slot $e^9$, and is fastened to the head A by the bolt $e^{10}$, which passes through the slot $e^9$ and the locking-nut $e^{13}$. This construction is well shown in Figs. 3 and 4.

The shaft $e$ is positively rotated in a direction opposite that of the shaft $a^2$ by means of the gear $e^{11}$ upon its inner end, which meshes with the gear $a^{12}$ on the shaft $a^2$. The shaft supports at its outer end the burnisher rest-roll E in a position in advance of but below the burnisher-roll B. (See Figs. 1, 3, and 6.) It also supports the rest C' for the rand or sole-edge beading roll and the rest D' for the waxing-roll. These rests are placed in relation to the tools with which they are used so as to provide a support so located or arranged in relation to the tool that the heel shall be held or supported by its edge while it is being presented to the operating-tools. Not only this, but the rests are provided with rounded surfaces, and are rotated by a shaft turning in a direction opposite that of the shaft carrying the operating-tools, and so that the surfaces of the rests and the tools travel in the same direction, and this direction is an inward one, so that the rests not only act as supports, but they also act positively to present and hold the heel in contact with the tool which is operating upon it, the two rolls acting together simultaneously to draw the work toward both rolls, and this action serves also to materially steady the shoe while it is being presented. The burnisher-roll B also has a rest, F, for the tread or surface of the top lift of the heel, which is inclined outwardly from the roll. It also has a beading-section, $f$, formed upon the rest F close to the burnishing-surface of the roll.

I prefer to make the rest F of the burnishing and beading section in one piece or one casting, and to form both the roll B and rest E hollow, or with a cavity to receive a gas-jet, by which the rolls are heated.

The burnishing-surface of the roll B is formed by the rounded ribs or projections, which extend from one edge of the roll diagonally across the same, and $f'$ are ribs or projections of the burnishing-rolls B, and $f^2$ ribs or projections of the rest-roll E. The roll B is curved upon its outer edge to approximate as nearly as practicable the edge of the trimmed heel which it is to burnish, and the burnishing-roll B is therefore made to follow the curve of the cutting-edge of the rotary trimmer with which it is to be used.

Of course the roll and the rest are removable from the ends of their respective shafts, in order that others of different form for different styles of work may be substituted. The rest-roll E has a working-surface which, preferably, is narrower than that of the roll B, and it is not formed to follow so accurately the form of the cutting-edge of the trimmer, but is made on the arc of a smaller circle, in order that it may be used in burnishing parts of the heel which are not readily reached by the surface of the roll B. The beading-roll C is shaped substantially as shown in Figs. 1, 9, and 10, and its rest C' preferably has a plain rounded surface, and is placed a little to the right of the working-edge of the roll.

The burnisher-roll B may have in addition to the tread or top-lift beading section a section for beading the rand or sole-edge, and when so formed it is shaped substantially as represented in Fig. 16, and in order that the work may be properly turned in relation to it I prefer to support the roll-rest E so that it may be moved downward and out of the way while a certain portion of the heel is being presented to this beading-section of the burnisher—namely, a part of the left side of the heel adjacent to the breast. (See Figs. 15, 16, and 17.)

The wax-roll D comprises the molded block $d$ of wax, which is fastened to the shaft by the clamping plates or collars $d'$ $d^2$. The clamping-plate $d'$ has a hub, $d^3$, through which a set-screw fastening it to the shaft passes. It also has the long sleeve $d^4$, which receives the collar $d^2$, and this collar $d^2$ serves to clamp the block of wax against the collar $d'$ and upon the sleeve, and it is locked in place by the nut $d^5$, which may be integral therewith. The collars $d'$ $d^2$ have spurs or projections $d^6$, which extend into the body of the wax. (See Fig. 5.)

In lieu of placing the rand or sole-edge beading roll upon the shaft $a^2$, it may be placed upon the shaft $e$, and the rest C' may then be supported by the arm $C^2$, extending from the hanger $e^3$. (See Fig. 11.) When this form of construction is used, the roll C' is not positively rotated. This arrangement has an advantage compared with that shown in Fig. 1, in that it permits the shoe to be moved to present all parts of the edge of the rand or sole to the beader without removing the heel from the rest.

In operation the boot or shoe is first presented to the rand or sole beading tool, and the edge of the heel is supported during the operation of beading by the rest C'. It is then presented to the burnishing-tool B with its edge resting upon the rest-roll E and its tread against the flange or rest F, as represented in Fig. 6, and as the rolls are positively moved toward each other the heel is drawn in contact with both rolls and steadied, and the heel is moved or turned by the operator back and forth from breast edge to breast edge to bring the entire surface of the edge of the heel from breast edge to breast edge about the back in contact with the surfaces of the rolls B E while it is held between them. This ordinarily completes the burnishing of the heel; but if the operator finds that certain parts need to be further finished he then presents such parts to one roll or the other, according to the curve of the unfinished section, generally, however, to the lower roll.

It will be seen that the rest-roll E is an active burnishing-roll and supplements the action of the burnisher-roll B, and that as the rest rotates it can be used not only without injuring the burnishing-surface given by the burnishing-roll B, but that it is also used to assist the operation of said tool, so that it operates to perform two functions; and it is therefore made as I have above indicated—namely, its transverse surface is struck upon the arc of a smaller circle than that of the roll B, in order to more effectually co-operate with it. (See Fig. 11$^a$.) Not only this, but the burnishing ribs or projections of the roll B run in an opposite direction from those of the roll E, so that the ribs or projections upon one roll serve to break the line of operation of the ribs upon the other roll rather than to coincide with that line, and in that way a smooth, regular, and uniform finish is obtained. The ribs of the two rolls are also arranged to force the heel toward the rest F. While the heel is held against the rest F, and is being turned upon the rest-roll, and between it and the burnisher B, the edge of the top lift is beaded by the beading projection $f$. If the heel is to be wax-finished, it is then presented to the waxing-roll D, the edge of the heel being placed upon the support D′, which, preferably, is smooth finished, and which may be of glass or any other suitable material, and it is then again presented to the action of the burnishing devices and treated as before. Whether the heel is wax-finished or not, after the burnishing is completed it is presented to the action of the brush-roll $a^9$, by which the entire edge of the heel and upper adjacent thereto is brushed and finished.

It is necessary to run the brush-roll $a^9$ somewhat faster than the burnishing-roll B and rest-roll E, and I have therefore timed the machine so that the shaft $a'$ is rotated somewhat more rapidly than the shafts $a^2$ $e$, the speed of these shafts being reduced by the gear connecting the shaft $a'$ with the shaft $a^2$.

The beading-roll rest C′ should be hung or supported upon a pivot, so that the plane of its working-surface may be changed or varied in relation to the beading-roll, as represented in Figs. 13 and 14.

Having thus fully described my invention, I claim and desire to secure by Letters Patent of the United States—

1. In a burnishing-machine, the combination, with the shafts $a^2$ and $e$ and their connecting-gears $a^{12}$ $a^{11}$, of the burnishing-roll B, secured to the said shaft $a^2$ and provided with the rest F, and the burnishing-roll E, secured to the said shaft $e$, and being below and in advance of the said burnishing-roll B, and thereby adapted to serve as a roll-rest as well as a burnisher, substantially as set forth.

2. The combination, in a burnishing-machine, of the burnishing-roll B, having ribs or projections $f'$ extending diagonally across the same in one direction, and the rest-roll E, having the ribs or projections $f^2$ extending across the same in a direction opposite to that of the ribs or projections $f'$ of the roll B, substantially as described.

3. In a burnishing-machine, the combination, with the rotary burnishing-roll B, having a burnishing-surface shaped transversely to approximate the shape of the surface of a trimmed heel, of the rotary burnishing-roll E, adapted to serve as a roll-rest, and having a transverse burnishing-surface struck upon a smaller arc than that of the transverse surface of the roll B, substantially as set forth.

4. In a burnishing-machine, the combination, with the shaft $a^2$, having the burnishing-roll B and the beading-roll C, of the shaft $e$, having the burnishing rest-roll E and the rotary rest C′, to co-operate with the said beading-roll, substantially as set forth.

5. In a burnishing-machine, the combination, with the shaft $a^2$, having the burnishing-roll B and the wax-roll D, of the shaft $e$, having the burnishing rest-roll E and the rotary heel-rest D′, to co-operate with the said wax-roll D, substantially as set forth.

6. In a burnishing-machine, the combination, with the shaft $a^2$, having the burnishing-roll B, and provided also with a wax-holding device, consisting of the sleeve or hub $d^3$ $d^4$, having the flange or collar $d'$, the flange or collar $d^2$, and nut $d^5$, of the shaft $e$, having the burnishing rest-roll E and the roll-rest D′, substantially as set forth.

7. In a burnishing-machine, the combination, with the shaft $a^2$, having the burnishing-roll B, and provided also with a wax-holding device, consisting of two collars, $d'$ $d^2$, one of which is adjustable or movable relative to the other, and both of which are provided with inwardly-extending pins or projections $d^6$, of the shaft $e$, having the burnishing rest-roll E and the roll-rest D′, to co-operate with the wax-roll, substantially as set forth.

8. In a burnishing-machine, the combination, with the shaft $a^2$ and the burnishing-roll B, carried thereby, of the shaft $e$, having the burnishing rest-roll E, and the adjustable hanger $e^3$, in which the said shaft $e$ is journaled, substantially as set forth.

9. The combination of the head $a$, supporting the shaft $a^2$, the burnisher-roll B, carried thereby, the hanger $e^3$, suspended from the shaft $a^2$, the shaft $e$, carried thereby, the slotted link $e^6$, and the clamping-nut $e^{13}$, substantially as described.

10. In a burnishing-machine, the combination, with the shaft $a^2$, provided with the burnishing-roll B and the beading-roll C, of the shaft $e$, provided with the burnishing-roll E and roll-rest C′, and the adjustable hanger $e^3$, in which the said shaft $e$ is journaled, substantially as set forth.

11. In a burnishing-machine, the combination, with the shaft $a^2$, provided with the burnishing-roll B and the wax-roll D, of the shaft $e$, having the burnishing-roll E and the rest D′, and the adjustable hanger $e^3$, in which the said shaft $e$ is journaled, substantially as set forth.

12. The combination, in a burnishing-machine, of the head $a$, the pulley-shaft $a'$, having the gear $a^{10}$, the shaft $a^2$, connected with the gear $a^{10}$ by the intermediate gear, $a^{11}$, and supporting the burnishing-wheel B, the beading-roll C, and waxing-roll D, with the shaft $e$, connected with the gear-wheel $a^{12}$ by the gear $e^{11}$, and the rests E C' D', carried thereby, substantially as and for the purposes described.

13. The combination, in a burnishing-machine, of the shaft $a'$, supporting the brush $a^9$, the shafts $a^2$ $e$, arranged to run at a slower rate of speed than the shaft $a'$, and supporting, respectively, the burnishing-roll B and rest-roll E, with said burnishing-roll and rest-roll, substantially as described.

JAMES W. CARVER.

Witnesses:
F. F. RAYMOND, 2d,
FRED. B. DOLAN.